(12) United States Patent
    Narayanan (10) Patent No.: US 10,489,234 B2
(45) Date of Patent: Nov. 26, 2019

(54) LARGE LOG FILE DIAGNOSTICS SYSTEM

(71) Applicant: Dell Products L.P., Round Rock, TX (US)

(72) Inventor: Vandhana Narayanan, Fremont, CA (US)

(73) Assignee: Dell Products L.P., Round Rock, TX (US)

( * ) Notice: Subject to any disclaimer, the term of this patent is extended or adjusted under 35 U.S.C. 154(b) by 97 days.

(21) Appl. No.: 15/230,146

(22) Filed: Aug. 5, 2016

(65) Prior Publication Data

US 2016/0342455 A1    Nov. 24, 2016

Related U.S. Application Data

(63) Continuation of application No. 14/626,399, filed on Feb. 19, 2015, now Pat. No. 9,430,316, which is a continuation of application No. 13/553,399, filed on Jul. 19, 2012, now Pat. No. 8,977,909.

(51) Int. Cl.
    *G06F 11/07* (2006.01)
(52) U.S. Cl.
    CPC ........ *G06F 11/079* (2013.01); *G06F 11/0706* (2013.01); *G06F 11/0772* (2013.01); *G06F 11/0778* (2013.01); *G06F 2221/2151* (2013.01)
(58) Field of Classification Search
    None
    See application file for complete search history.

(56) References Cited

U.S. PATENT DOCUMENTS

| | | | |
|---|---|---|---|
| 5,935,262 A | 8/1999 | Barrett et al. | |
| 5,996,054 A | 11/1999 | Ledain et al. | |
| 6,535,949 B1 | 3/2003 | Parker | |
| 6,598,179 B1 * | 7/2003 | Chirashnya | ........... G06F 11/079 714/19 |
| 6,611,852 B1 | 8/2003 | Morley et al. | |
| 6,842,870 B2 * | 1/2005 | Austen | ............... G06F 11/0781 714/20 |
| 7,721,280 B1 | 5/2010 | Frisbie et al. | |
| 8,165,683 B2 * | 4/2012 | Carlson | ............. A61B 5/02405 607/45 |
| 8,423,992 B1 | 4/2013 | Frisbie et al. | |
| 8,949,669 B1 * | 2/2015 | Khokhar | ............... G06F 11/079 714/26 |
| 8,977,909 B2 | 3/2015 | Narayanan | |
| 9,195,668 B2 | 11/2015 | Sipek | |
| 2003/0131093 A1 | 7/2003 | Aschen et al. | |
| 2004/0148462 A1 | 7/2004 | Uysal et al. | |
| 2004/0225381 A1 | 11/2004 | Ritz et al. | |

(Continued)

*Primary Examiner* — Amine Riad
(74) *Attorney, Agent, or Firm* — Haynes and Boone, LLP (57) ABSTRACT

An information handling system (IHS) diagnostic system includes a user IHS that is coupled to a network and operable to generate a log file that is associated with a user IHS error. A distributed processing IHS is coupled to the user IHS through the network and operable to receive the log file generated by the user IHS over the network. That log file is then stored on a plurality of node IHS's in the distributed processing IHS. When a job request is received from the user IHS over the network, a job associated with the job request is performed on the log file using the plurality of node IHS's to create a job result. The job result that includes at least one cause of the user IHS error is then provided to the user IHS.

20 Claims, 10 Drawing Sheets

(56) References Cited

U.S. PATENT DOCUMENTS

| | | |
|---|---|---|
| 2005/0055385 A1 | 3/2005 | Sinha et al. |
| 2005/0234909 A1 | 10/2005 | Bade et al. |
| 2006/0020616 A1 | 1/2006 | Hardy et al. |
| 2008/0195670 A1 | 8/2008 | Boydstun et al. |
| 2008/0319960 A1 | 12/2008 | Chang |
| 2009/0254780 A1 | 10/2009 | Mizuno |
| 2012/0216007 A1 | 8/2012 | Tsirkin |
| 2013/0019180 A1 | 1/2013 | Kimbuende et al. |
| 2013/0185592 A1 | 7/2013 | Fleming et al. |
| 2013/0311441 A1 | 11/2013 | Erdogan et al. |
| 2013/0332901 A1 | 12/2013 | Berg et al. |
| 2014/0025995 A1 | 1/2014 | Narayanan |
| 2015/0218100 A1 | 5/2015 | Foisy et al. |
| 2015/0160992 A1 | 6/2015 | Narayanan |
| 2015/0370626 A1 | 12/2015 | Miyagawa et al. |

\* cited by examiner

LARGE LOG FILE DIAGNOSTICS SYSTEM

CROSS-REFERENCE TO RELATED APPLICATIONS

This is a Continuation application to U.S. Utility application Ser. No. 14/626,399, filed Feb. 19, 2015, entitled "Large Log File Diagnostics System," which in turn is a Continuation application to U.S. Utility application Ser. No. 13/553,399, filed Jul. 19, 2012, entitled "Large Log File Diagnostics System," now U.S. Pat. No. 8,977,909, issued on Mar. 10, 2015, the disclosures of which is incorporated herein by reference in their entirety.

BACKGROUND

The present disclosure relates generally to information handling systems (IHS's), and more particularly to diagnostics system for large log files generated by IHS's.

As the value and use of information continues to increase, individuals and businesses seek additional ways to process and store information. One option is an IHS. An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Some IHS's such as, for example, those that include the Advanced Infrastructure Manager (AIM®) available from Dell®, Inc., log all events that occur within the system and can generate relatively large log files (e.g., having sizes from tens to even hundreds of gigabytes of data and larger) in a relatively short time span that are stored locally on the IHS as "rolling logs". When an error occurs in the IHS, the log files are sent to support technicians that review these hundreds and thousands of line log files line by line in order to determine the cause of the error, which typically includes searching the log files using keywords to attempt to determine the events that may have caused the error. Due to the size of these log files, diagnosis of errors with the IHS using its log files is difficult, requires a large amount of time, and conventionally is only plausible in a few specific circumstances.

Accordingly, it would be desirable to provide an improved IHS diagnostic system for large log files.

SUMMARY

According to one embodiment, an information handling system (IHS) diagnostic system including a user IHS that is coupled to a network and operable to generate a log file that is associated with a user IHS error; and a distributed processing IHS that is coupled to the user IHS through the network, wherein the distributed processing IHS is operable to: receive the log file generated by the user IHS over the network; store the log file on a plurality of node IHS's; receive a job request from the user IHS over the network; perform a job associated with the job request on the log file using the plurality of node IHS's to create a job result; and provide the job result to the user IHS, wherein the job result includes at least one cause of the user IHS error.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
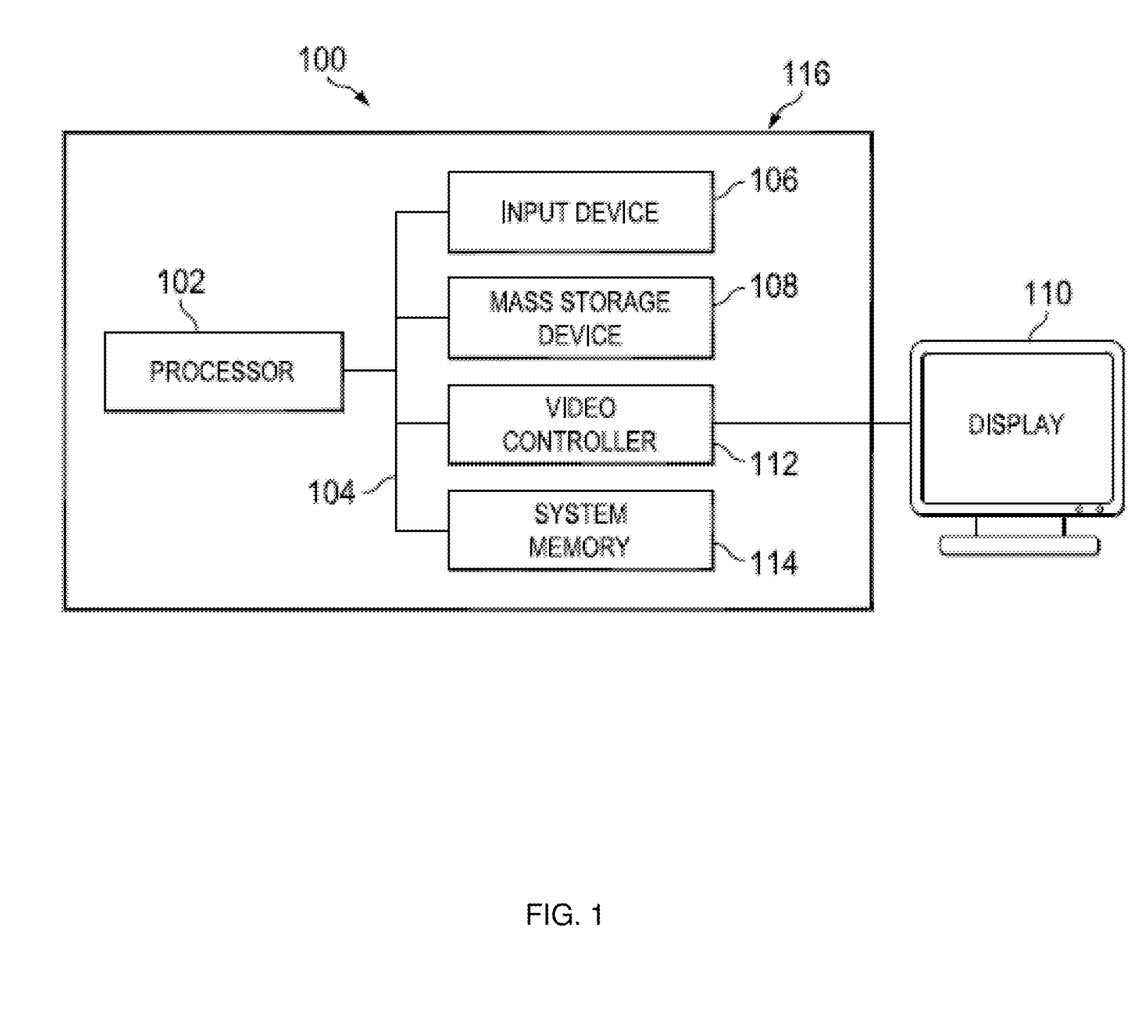
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
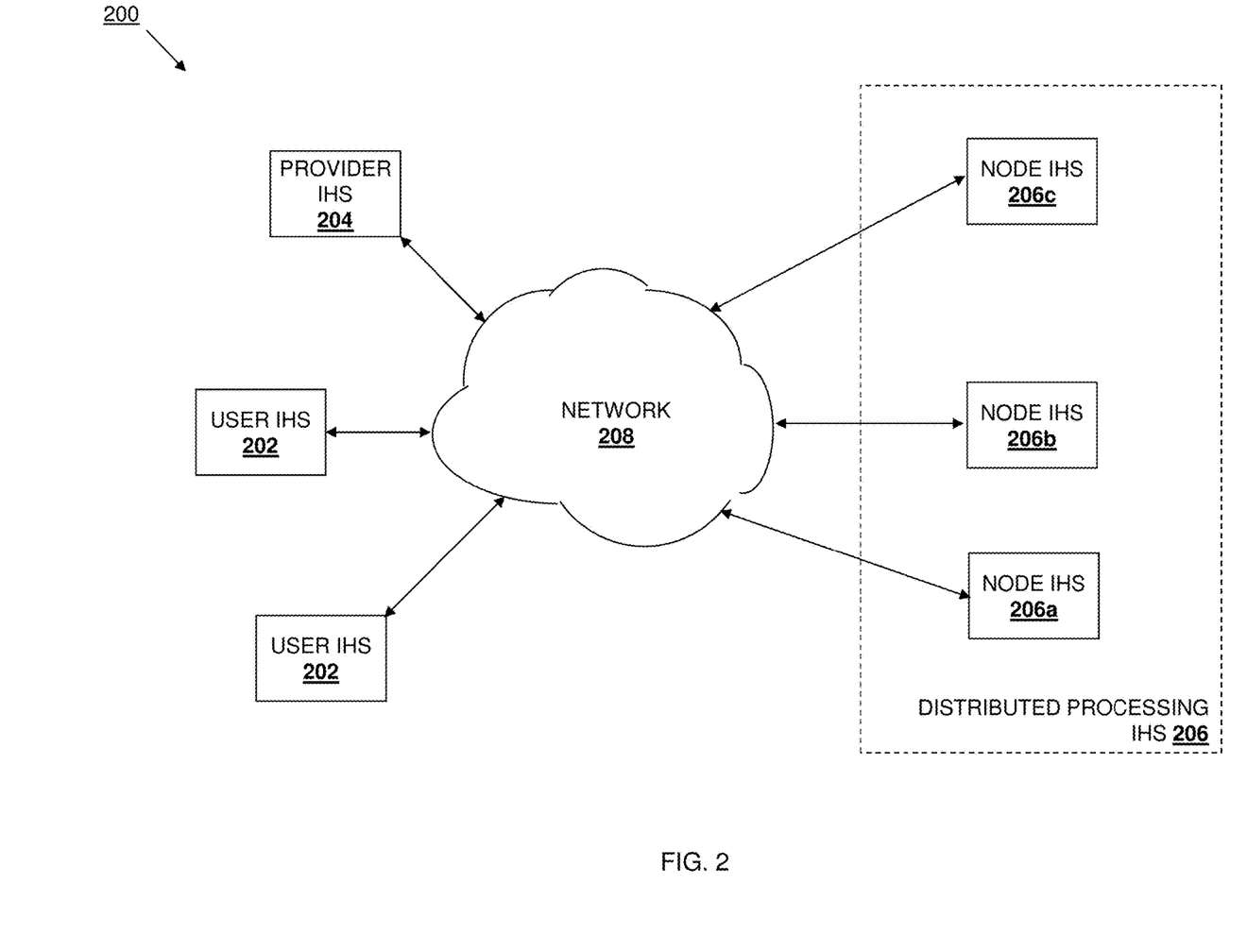
FIG. 2 is a schematic view illustrating an embodiment of an IHS diagnostic system.

Referring now to FIG. 2, an embodiment of an IHS diagnostics system 200 is illustrated. The IHS diagnostics system 200 includes a plurality of user IHS's 202, a provider IHS 204, and a distributed processing IHS 206 coupled together through a network 208. The distributed processing IHS 206 includes a plurality of node IHS's 206a, 206b, and 206c that are each coupled to the network 208. In an embodiment, any of the user IHS's 202, the provider IHS 204, and the node IHS's 206a may be the IHS 100 and/or include some of the components of the IHS 100, described above with reference to FIG. 1. In an embodiment, one or more of the user IHS's 202 may include one or more applications that generate relatively large log files. For example, one or more of the user IHS's may include an Advanced Infrastructure Manager (AIM®) or AIM® controller from Dell, Inc. that generates multi-gigabyte log files describing all the events that occur within the system. While in the illustrated embodiment, two user IHS's 202 are depicted, one of skill in the art will recognize that any number of user IHSs 202 may be included in the IHS diagnostic system 200. In an embodiment, the provider IHS 204 may include a web server that is operable to communicate over the network 208 with the user IHS's 202 and the distributed processing IHS 206.

The distributed processing IHS 206 may include a distributed computing platform for performing batch processing. Thus, while in the illustrated embodiment the distributed processing IHS 206 includes three node IHS's 206a, 206b, and 206c, one of skill in the art will recognize that any number of node IHSs may be included in the distributed processing IHS 206, including hundreds and even thousands or more node IHS's. In one example, the plurality of node IHS's 206a, 206b, and 206c are computationally independent and run the Apache Hadoop® software framework to provide the distributed processing IHS 206. In an experimental embodiment, a user IHS 202, the provider IHS 204, and the node IHS's 206a, 206b, and 206c were each provided with at least two quad-core processors and at least 500 gigabytes of hard drive space. The Community Enterprise Operating System (CentOS), version 6, described in detail at http://www.centos.org/, was installed on the user IHS 202, the provider IHS 204, and at the node IHS's 206a, 206b, and 206c. Apache Hadoop software was then installed on the user IHS 202, the provider IHS 204, and the node IHS's 206a, 206b, and 206c, as described at http://hadoop.apache.org/common/docs/r0.15.2/cluster_setup.html. Cascading, available at http://www.concurrentinc.com/downloads/, was then added as a software abstraction layer for Adache Hadoop. Jetty web server was then installed on the provider IHS 204. While the specific steps and elements detailed above were used to create an experimental embodiment of the diagnostic system of the present disclosure discussed below, one of skill in the art will recognize that a variety of distributed computing platforms that perform batch processing, along with associated operating systems, software abstraction layers, and web server software, other than those described herein, will fall within the scope of the present disclosure.

Figure 3:
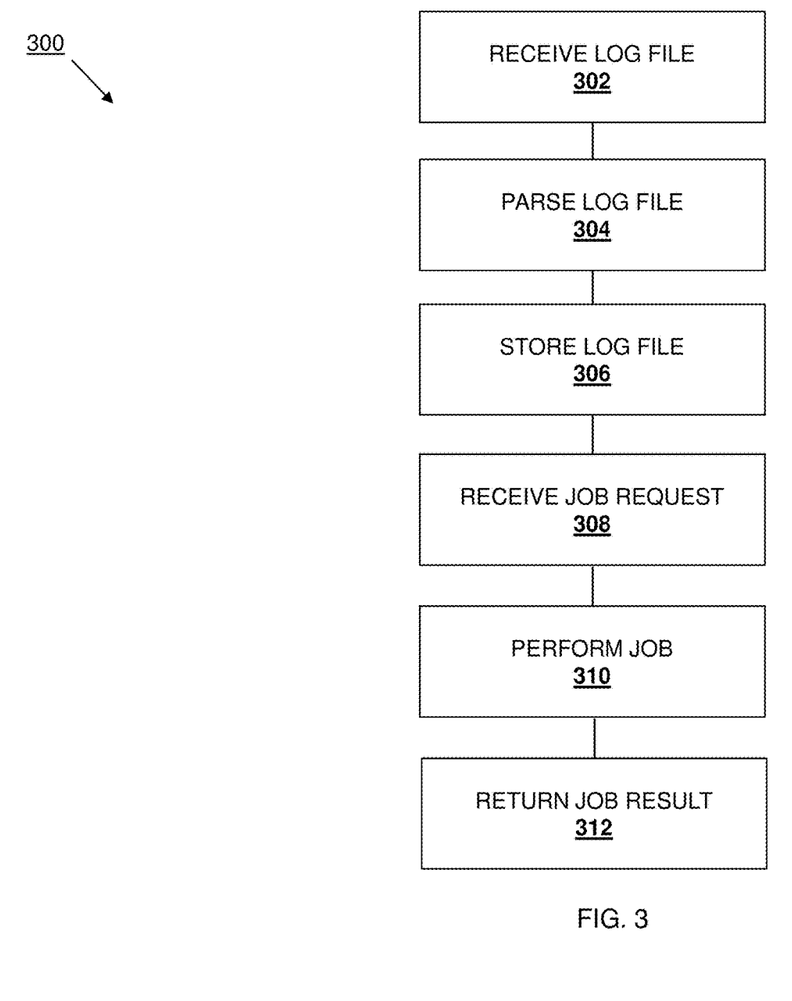
FIG. 3 is a flow chart illustrating an embodiment of a method for diagnosing an error in an IHS.

As described according the method 300 below, the node IHS's 206a, 206b, and 206c in the distributed processing IHS 206 are used work through volumes of complex data to clean and structure the data such that the cause of errors in the user IHS's 202 may be determined. For example, a plurality of Map Reduce jobs may be created (e.g., using Cascading Application Programming Interfaces (APIs) in the experimental embodiment discussed above) for use with the node IHS's 206a, 206b, and 206c running Apache Hadoop in order to have receive log files, distribute portions of the log files to the node IHS's 206a 206b, and 206c for processing, and then collect the processed data in order to combine it into a job result, discussed in further detail below. That processing may include parsing the data from the log file to clean and structure the data such that it may be stored in the distributed processing IHS 206, followed by performing a variety of jobs as instructed by the user IHS's 202 or the provider IHS 204 in order to provide job result interfaces that allow the causes of errors in the user IHS's 202 to be determined. In an embodiment, processing by the distributed processing IHS 206 may be performed in response to the uploading of log files and the provision of job requests through interfaces on a website provided by the provider IHS 204 using Hypertext Markup Language (HTML) web pages with Java® servlets, and similar interfaces may be provided to allow the job results to be viewed to diagnose the cause of IHS errors. Alternatively, the interfaces for uploading log files, providing job requests, and reviewing job results may be provided in an application running on the user IHS and administrator IHS connected to the user IHS.

Figure 4:
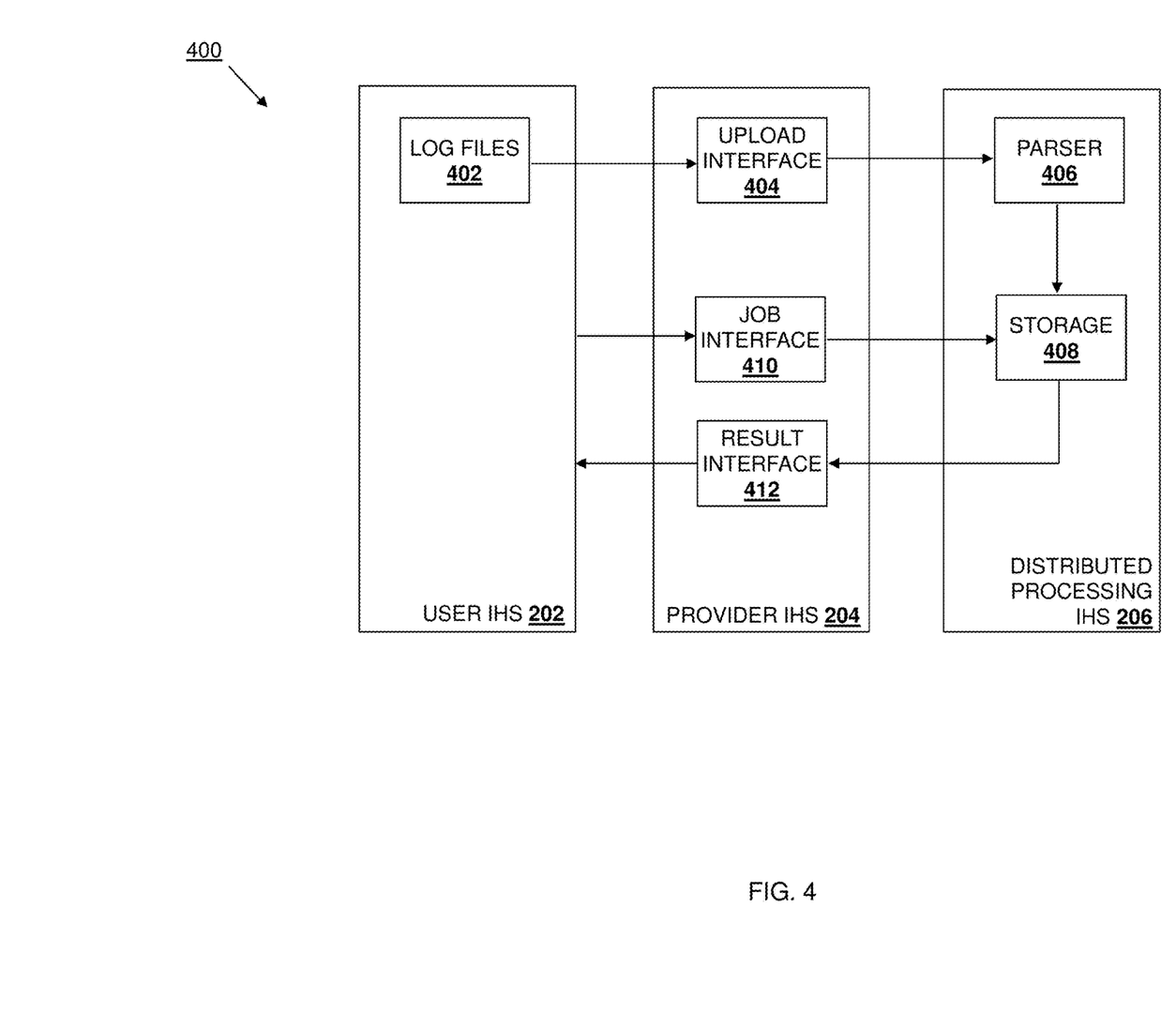
FIG. 4 is a schematic view illustrating a portion of the method flow of FIG. 3.
Figure 5A:
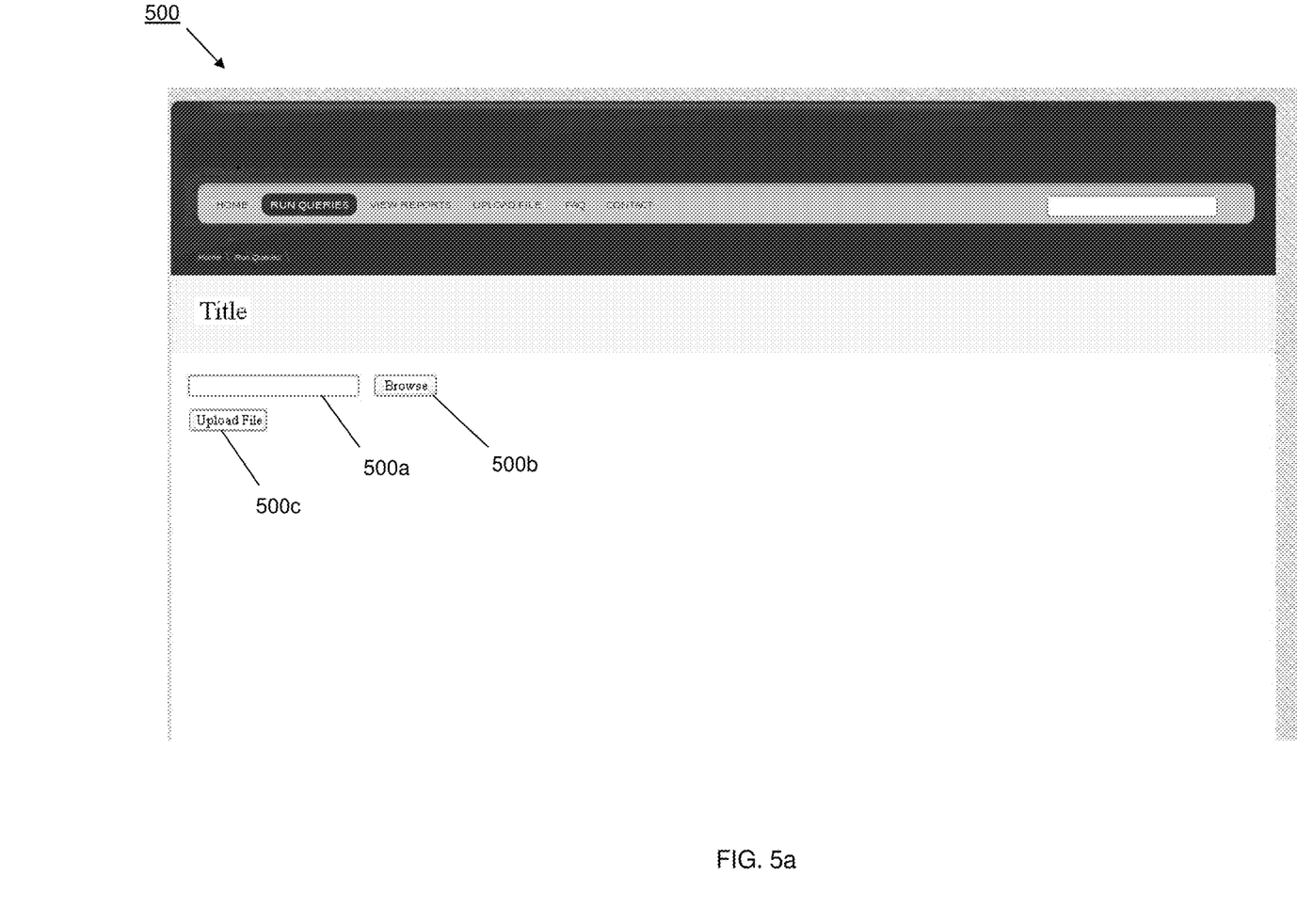
FIG. 5a is a screenshot illustrating an embodiment of a log file provision web page.

Referring now to FIGS. 3, 4, and 5a, a method 300 for diagnosing IHS errors is illustrated. The method 300 begins at block 302 where a log file is received. As discussed above, the user IHS's 202 may generate relatively large log files 402 (e.g., multi-gigabyte log files) during their operation, as illustrated in the flow 400 of FIG. 4. For example, user IHS's 202 running the AIM® or AIM® controller from Dell Inc. generate verbose log files that include a myriad of operations by the AIM controller and its components such as the creation of template operating systems and their deployment to servers, the movement of workloads or personas from server to server, and/or a variety of other log file events known in the art.

In an embodiment, the provider IHS 204 may provide an upload interface 404 that includes a log file upload web page 500 having a log file input 500a, a browse button 500b, and an upload file button 500c. In one example, the log file upload web page 500 is provided by the provider IHS 204 over the network 208 to at least one of the user IHS's 202, and the at least one user IHS 202 may be used to enter a location of a log file into the log file input 500a or find a log file on the user IHS 202 using the browse button 500b, and then upload the log file using the upload file button 500c. In another embodiment, the log file upload page 500 may be provided to an administrator IHS connected to the user IHS's 202 such that an administrator may provide log files from one or more of the user IHS's 202 to the distributed processing IHS 206. In one example, controller log files (e.g., a log file from a controller of multiple user IHS's such as a AIM controller of multiple AIM systems) may be sent to the distributed processing IHS 206. In other embodiments, the user IHS's 202 may be operable to automatically upload log files 402 to the distributed processing IHS 206 without the need for the log file upload web page 500, (e.g., log files from a user IHS may be uploaded weekly, daily, hourly, etc.) Furthermore, at block 302 of the method 300, a plurality of log files generated from a plurality of different user IHS's 202 may be sent to the distributed processing IHS 206.

Referring now to FIGS. 3 and 4, the method 300 proceeds to block 304 where the log files received by the distributed processing IHS 206 are parsed. As discussed above, the distributed processing IHS 206 may be operable (e.g., through one or more Map Reduce jobs) to receive a log file 402 and distribute portions of that log file 402 to the plurality of node IHS's 206a, 206b, and 206c. Those node IHS's 202 may then provide a parser 406 that allows each node IHS 206a, 206b, and 206c in the distributed processing IHS 206 to parse their respective portion of the log file 402 to clean up that portion of the log file 402 and introduce structure to the data in that portion of the log file 402. In an embodiment, each node IHS 206a, 206b, and 206c may clean their respective portion of the log file by removing data from the log file that is known to be unnecessary in the performance of jobs by the distributed processing IHS 206, discussed in further detail below. For example, data such as tags for each log that describe the severity of the log (e.g., "info", "warn", "error", etc. may be removed from the portions of the log file at block 304 of the method 300. In addition, logs that were generated without any timestamp values (e.g., stack traces) may be separated and stored in an intermediate file separate from the log file. Furthermore, in an embodiment, each node IHS 206a, 206b, and 206c may structure the data in their respective portion of the log file by placing data from the portion of the log file into a plurality of predefined locations in a data structure (e.g., into predefined columns in a database.) For example, a data structure including predefined columns for a timestamp, a component that generated the log file, and the actual log message, may be provided for data in the portion of the log file parsed by each of the node IHS's 202. The parsing of the data in the log file allows the distributed processing IHS 206 to distinguish pertinent events from inconsequential events, categorize spikes in system event activity, create structure in the data so that the data may be consumed by jobs efficiently (discussed in further detail below), and/or provides a variety of other benefits with respect to the log file data that would be appreciated by one of skill in the art.

The method 300 then proceeds to block 306 where the log file is stored. In an embodiment, the portions of the log files that were parsed by the node IHS's 206a, 206b, and 206c in block 304 of the method 300 to create semi-structured log file data are then stored in storage 408 that may include the node IHS's 206a, 206b, and 206c. Thus, blocks 302, 304, and 306 of the method 300 may be performed to collect and parse large log files from one or more IHS's 202 using the distributed processing IHS 206 such that the data in those large log files is cleaned and then stored in a structured format on the distributed processing IHS 206. The use of the distributed processing IHS 206 allows the voluminous amounts of data generated by user IHS's in log files (e.g., on the order of terabytes of log file data) to be cleaned, structured to a definite format, and stored in a database. As discussed in detail below, this allows the data in those large log files to be used for the diagnosis of user IHS errors that provides significant benefits over conventional diagnostic systems.

Referring now to FIGS. 3, 4, 5b, and 5c, the method 300 then proceeds to block 308 where a job request is received. In an embodiment, the provider IHS 204 may provide a job interface 410 including a run query web page 502 having a plurality of configurable queries 502a, 502b, 502c, 502d, 502e, and 502f that allow for the provision of a job request to the distributed processing IHS 206. For example, the configurable query 502a may allow a job request to be created that instructs the distributed processing IHS 206 to perform a job on the log file data stored in the distributed processing IHS 206 that will allow all the events related to a system entity (e.g., a persona) with a particular ID to be shown. In another example, the configurable query 502b may allow a job request to be created that instructs the distributed processing IHS 206 to perform a job on the log file data stored in the distributed processing IHS 206 that will allow all the events related to a system entity (e.g., a persona) with a particular ID and a particular component to be shown. In another example, the configurable query 502c may allow a job request to be created that instructs the distributed processing IHS 206 to perform a job on the log file data stored in the distributed processing IHS 206 that will allow all the events in a particular time period to be shown. In another example, the configurable query 502d may allow a job request to be created that instructs the distributed processing IHS 206 to perform a job on the log file data stored in the distributed processing IHS 206 that will allow all the events related to a particular ID and within a particular time period to be shown. In another example, the configurable query 502e may allow a job request to be created that instructs the distributed processing IHS 206 to perform a job on the log file data stored in the distributed processing IHS 206 that will allow all the events related to a persona with a particular ID that was in a particular state to be shown. In another example, the configurable query 502f may allow a job request to be created that instructs the distributed processing IHS 206 to perform a job on the log file data stored in the distributed processing IHS 206 that will allow all the events related to a persona that transitioned between two of particular states to be shown. While a plurality of examples of configurable queries 502a, 502b, 502c, 502d, 502e, and 502f that allow for the provision of a job request to the distributed processing IHS 206 are illustrated and described herein, one of skill in the art will recognize that a variety of configurable queries may be created that will fall within the scope of the present disclosure. For example, the Cascading API discussed above with respect to the experimental embodiment may be used to create configurable queries that cause the distributed processing IHS 206 to perform a variety of different jobs on the stored log file data while remaining within the scope of the present disclosure. While a few examples of jobs are provided below, those examples should not be interpreted as limiting, as a wide variety of jobs will fall within the scope of the present disclosure.

For example, a job might include searching by an identifier in order to allow a user to query a file based on a file identifier. Examples of identifiers may include persona identifiers, server identifiers, server names, and/or a variety of other identifiers known in the art. Input into an identifier search job may include the cleaned up data from a log parser job, and the identifier search job may query the log file for information requested by the user based on the identifier. The job may include a plurality of parameters such as, for example, an input path, an output path, and a key value, and the entries in the log file would be queried based on the key value (e.g., using the Regex Filter). The output tuples of the identifier search job may then be merged with the rest of the fields and the file output file stored in the file server.

In another example, a job might include showing all events that occur between two time periods. Input into a time interval event job may include the cleaned up data from a log parser job. The job may include a plurality of parameters such as, for example, a path to an input dataset, a path where an output needs to be written to, and two time stamp values. Date Parser, a method in Cascading API that returns timestamp value in long format, may be used to generate the timestamp in long format as a separate field. An expression filter may then be used to filter all logs that lie in the specified time interval, and the resulting data may be stored in the file server.

In another example, a job might include querying all events related to a specific persona in a given time interval. Input into a time interval event job may include the cleaned up data from a log parser job. The job may include a plurality of parameters such as, for example, a path to an input dataset, a path where an output needs to be written to, and the identifier or key value for the log that is being filtered. The job may use the Regex Filter to further clean the log file based on the supplied key value. Upon display in the user interface, the user may be given an option to view detailed information regarding the persona or to look for related events in the entire log or within the specified time interval. In an embodiment, additional parameters may be passed to this job to filter the log files based on more constraints, a combination of different constraints, etc.

Figure 5B:
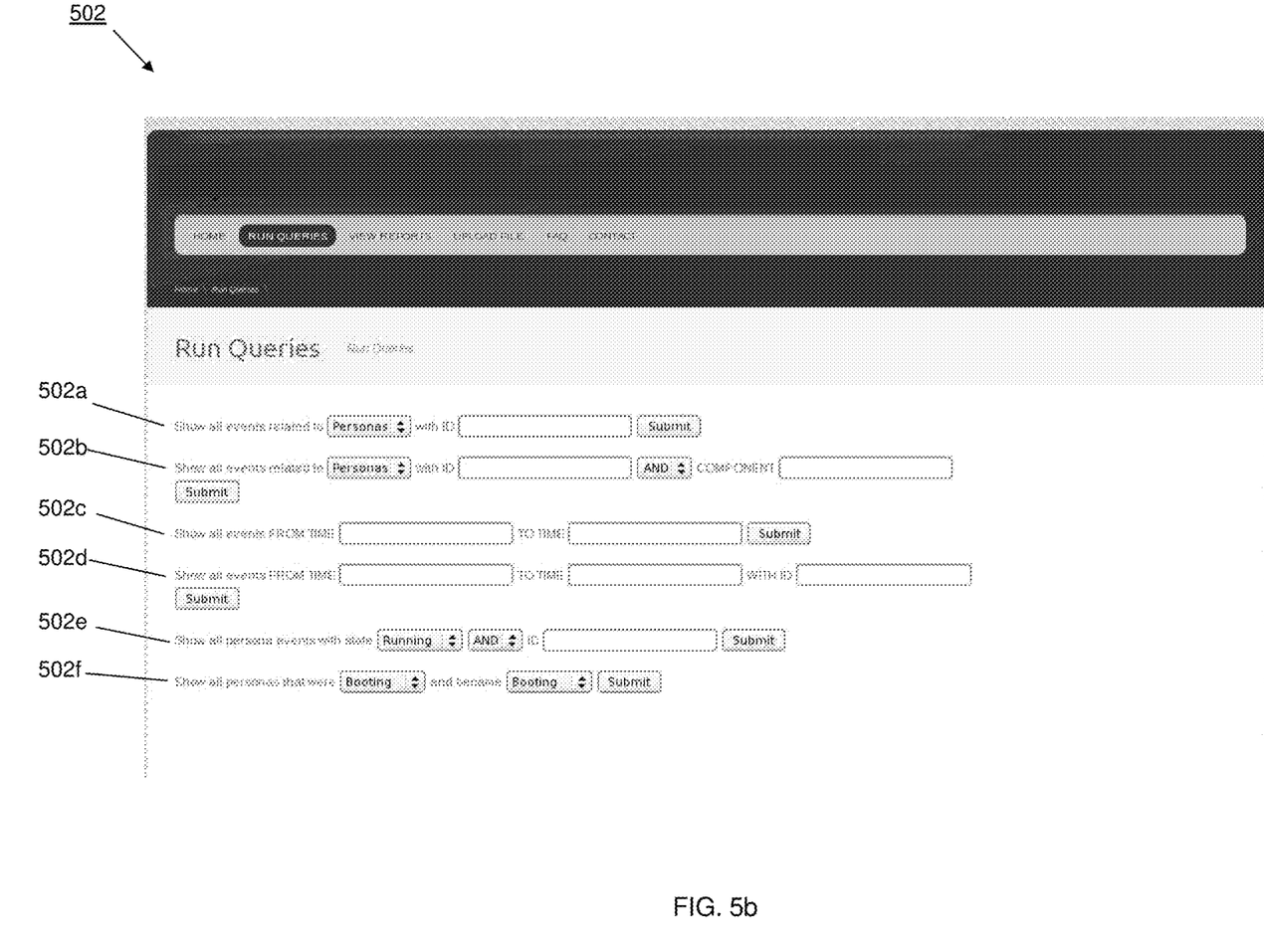
FIG. 5b is a screenshot illustrating an embodiment of a run query job request web page.
Figure 5C:
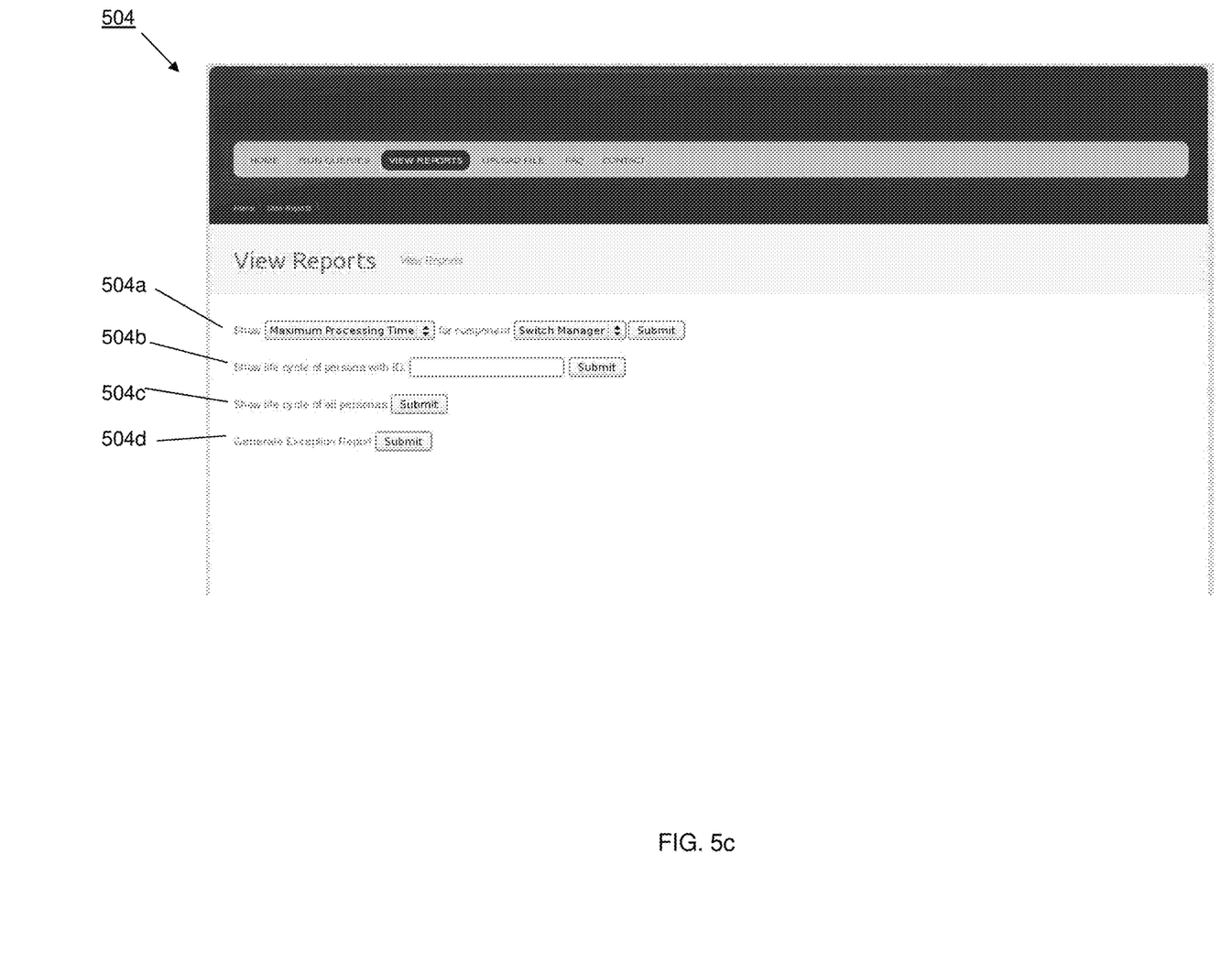
FIG. 5c is a screenshot illustrating an embodiment of a run report job request web page.
Figure 5D:
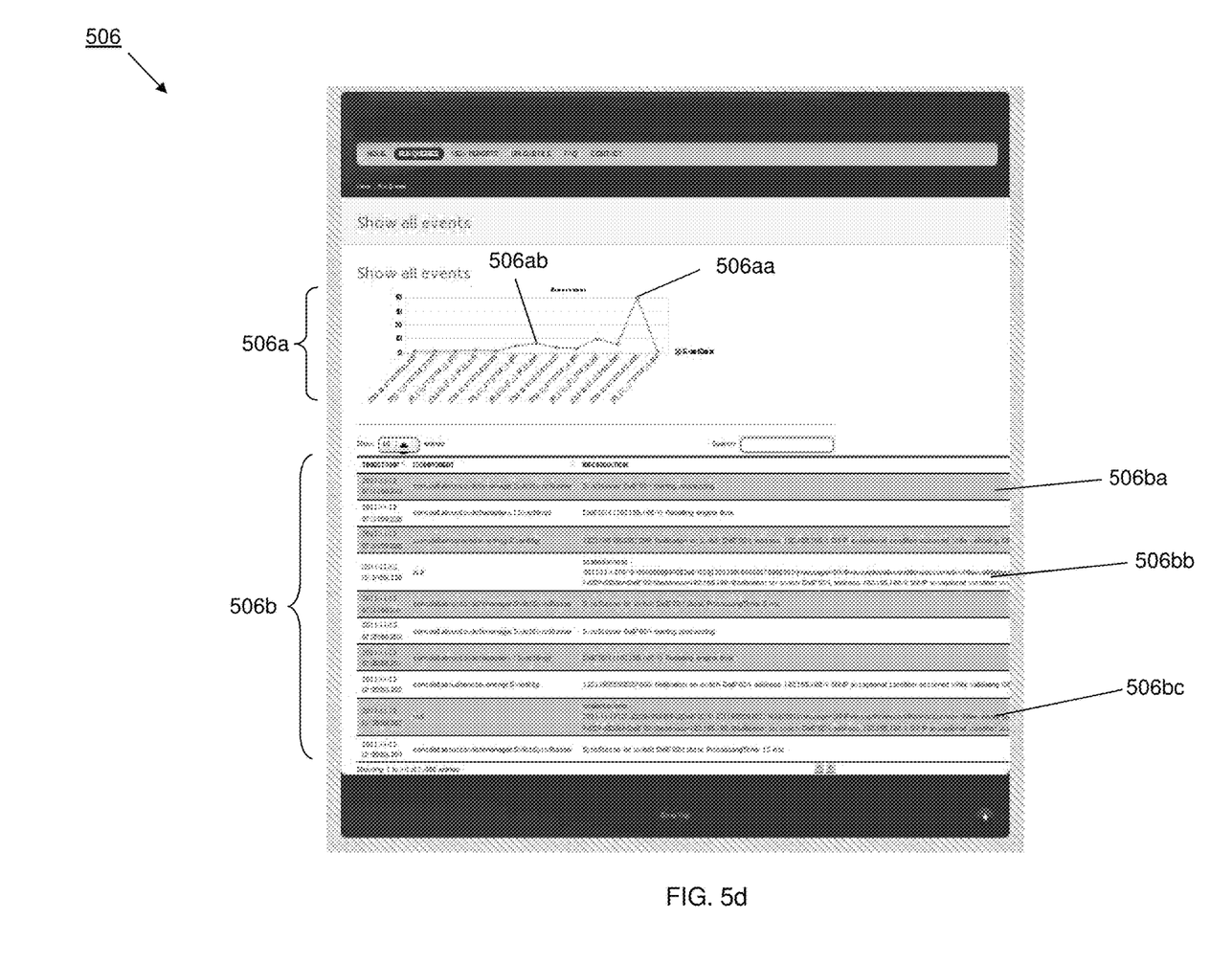
FIG. 5d is a screenshot illustrating an embodiment of a job result web page.
Figure 5E:
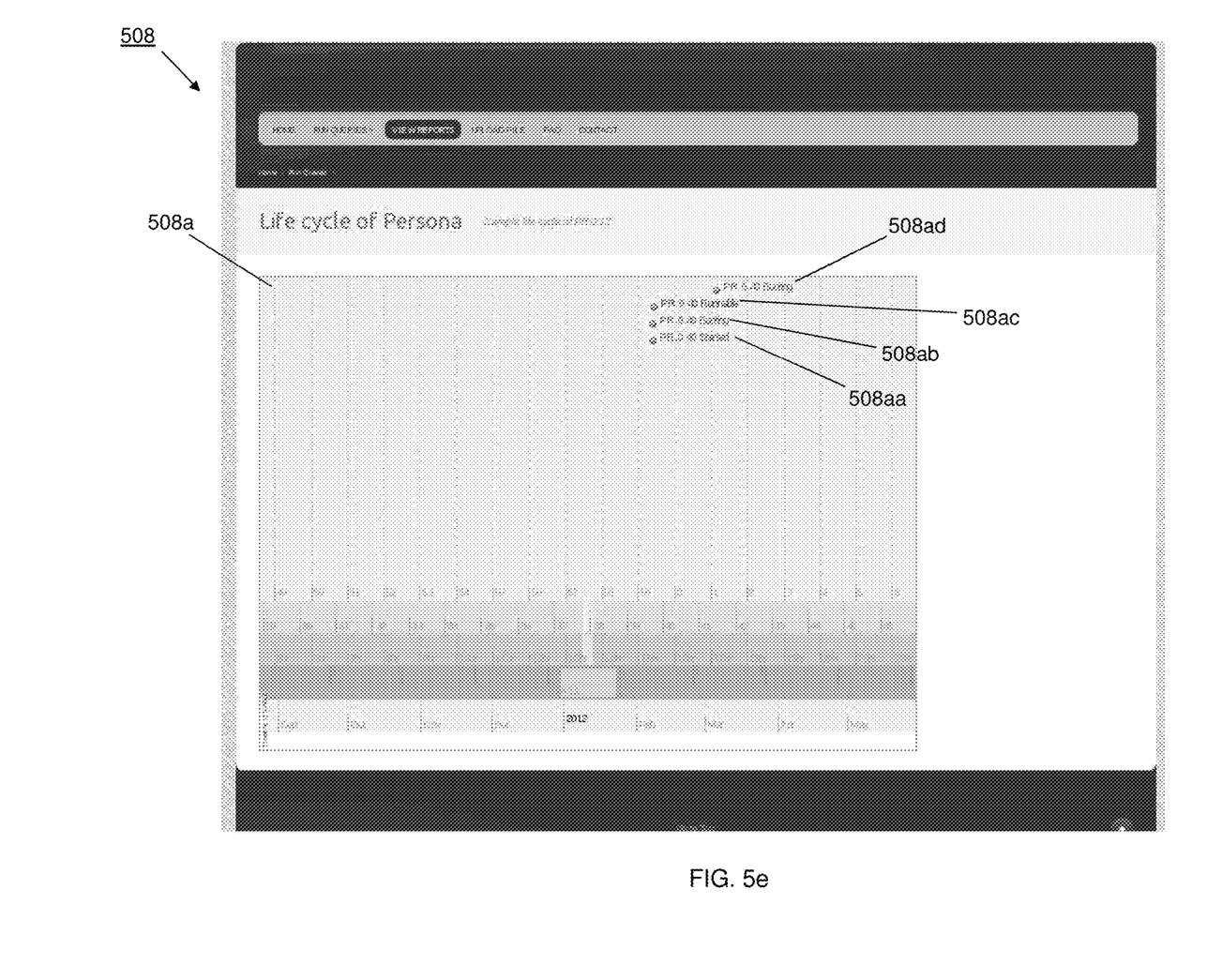
FIG. 5e is a screenshot illustrating an embodiment of a job result web page.
Figure 5F:
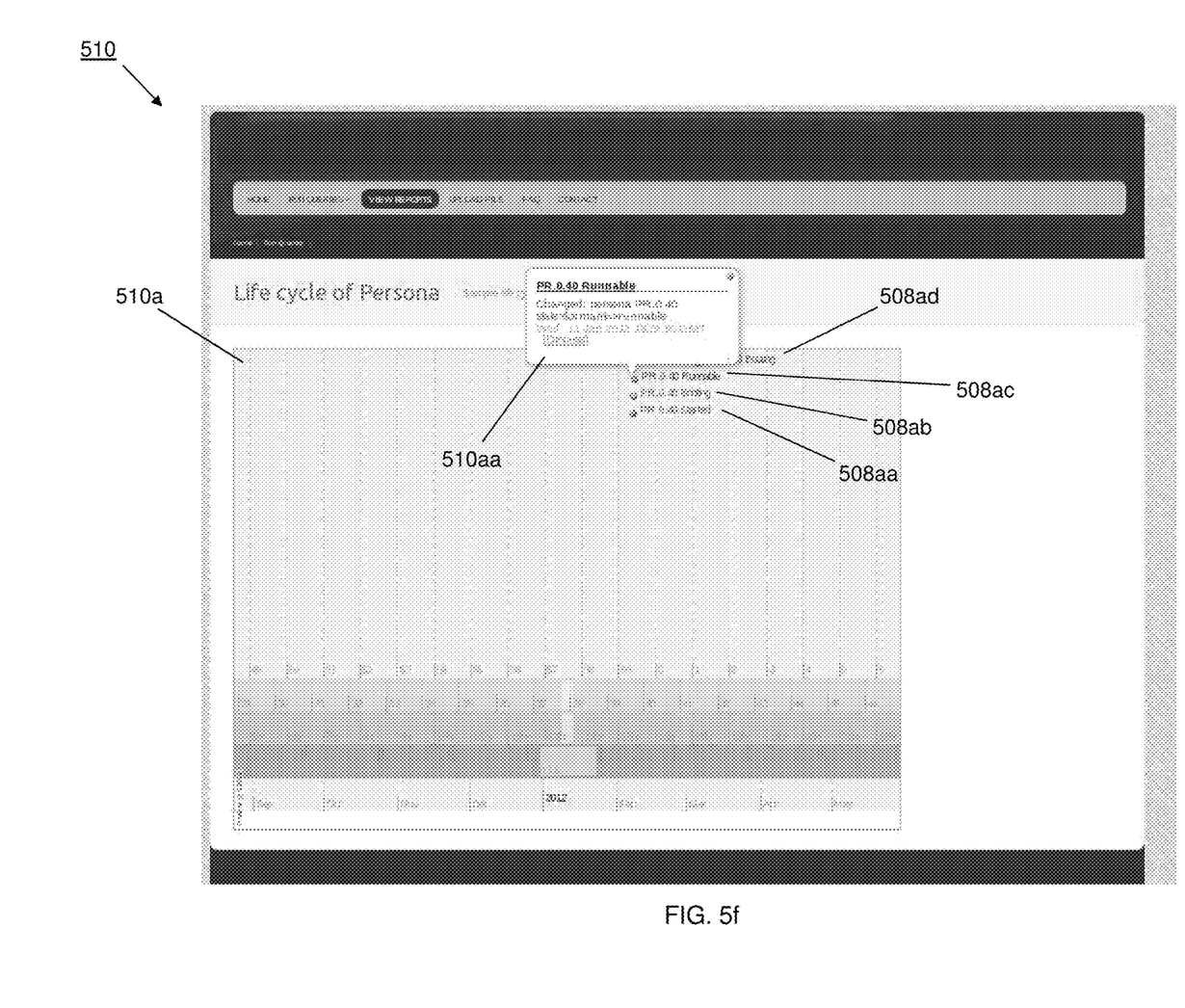
FIG. 5f is a screenshot illustrating an embodiment of a job result web page.

In another embodiment, the provider IHS 204 may provide the job interface 410 including a run reports web page 504 having a plurality of configurable reports 504a, 504b, 504c, and 504d that allow for the provision of a job request to the distributed processing IHS 206. For example, the configurable report 504a may allow a job request to be created that instructs the distributed processing IHS 206 to perform a job on the log file data stored in the distributed processing IHS 206 that will allow the performance (e.g., a maximum processing time) of a particular component to be shown. In the illustrated embodiment, the configurable report 504a is providing a job request to the distributed processing IHS 206 to perform a usage efficiency calculation by determining the maximum time, minimum time, average, time, etc., taken by a switch manager to process a request. In another example, the configurable report 504b may allow a job request to be created that instructs the distributed processing IHS 206 to perform a job on the log file data stored in the distributed processing IHS 206 that will allow all the life cycle of a system entity (e.g., a persona) with a particular ID to be shown. In another example, the configurable report 504c may allow a job request to be created that instructs the distributed processing IHS 206 to perform a job on the log file data stored in the distributed processing IHS 206 that will allow the life cycles of all system entities (e.g., personas) to be shown. In another example, the configurable report 504d may allow a job request to be created that instructs the distributed processing IHS 206 to perform a job on the log file data stored in the distributed processing IHS 206 that will generate an exception report (e.g., to allow the tracking of any log file data in which an anomaly occurs). While a plurality of examples of configurable reports 504a, 504b, 504c, and 504d that allow for the provision of a job request to the distributed processing IHS 206 are illustrated and described herein, one of skill in the art will recognize that a variety of configurable reports may be created that will fall within the scope of the present disclosure. For example, the Cascading API discussed above with respect to the experimental embodiment may be used to create configurable reports that cause the distributed processing IHS 206 to perform a job on the on the stored log file data.

For example, a job might include creating an exception report by reviewing the entire log file to find probable exceptions such as discovery issues and collect the timestamps with exceptions for presentation to the user. Input into an exception report job may include the cleaned up data from a log parser job. The job may include a plurality of parameters such as, for example, a path to an input dataset and a path where an output needs to be written to. Commonly occurring exceptions may be studied and patterns extracted from those exceptions. The patterns may then be translated to regular expressions. The Regex Filter may be used to look through log files for the exceptions, and the exceptions with the stack trace and time at which they were logged may be extracted and stored in a flat file in the file server.

In one example, the job interface 410 including the run query page 502 or the run reports web page 504 is provided by the provider IHS 204 over the network 208 to at least one of the user IHS's 202, and the at least one user IHS 202 may then be used to instruct the distributed processing IHS 206 to perform a job on the log file data stored in the distributed processing IHS 206, as discussed above. That job request may then be forwarded to the distributed processing IHS 206 by the provider IHS 204. In another embodiment, the job interface 410 including the run query web page 502 or the run reports web page 504 may be provided to an administrator IHS connected to the user IHS's 202 such that an administrator may instruct the distributed processing IHS 206 to perform a job on the log file data stored in the distributed processing IHS 206, as discussed above.

In other embodiments, job requests may be automatically sent to the distributed processing IHS 206 without the need for the job interface 410 including web pages such as the run query web page 502 or the run reports web page 504. In some embodiments, a user IHS 202 may generate a real-time alert that is associated with an error occurring in the user IHS 202, and that real-time alert may be provided to the distributed processing IHS 204 (e.g., through the provider IHS 204 or directly to the distributed processing IHS 206 from the user IHS 202.) In response to receiving that real-time alert, the distributed processing IHS 206 may execute a job request to perform a job on the log file data stored in the distributed processing IHS 206. In some embodiments, a log file may be sent to the distributed processing IHS 206 in response to the real-time alert being generated by the user IHS 202 (e.g., in response to an error occurring in the user IHS 202, a real-time alert may be generated that results in a current log file in the user IHS 202 being automatically sent to the distributed processing IHS 206 along with a job request that is directed to determining the cause of that error.) Thus, in some embodiments, the diagnostic system 200 analyzes log file data "post-mortem", i.e., at some time after an error in the user IHS's 202 has occurred. In other embodiments, real-time analysis may be enabled by the provision of a log file following an alert that is generated in response to an error occurring in the user IHS 202. Furthermore, real-time and historical log file data analysis may be combined to use log file data obtained in real-time along with log file data previously stored in the distributed processing IHS 206 in order to diagnose the cause of an error in the user IHS 202.

Referring now to FIGS. 3 and 4, the method 300 then proceeds to block 310 where a job is performed. In an embodiment, the job request received by the distributed processing IHS 206 may correspond to a job (e.g., a Map Reduce job) that may be divided up into sub-jobs to be performed on at least a portion of the log file data stored on the distributed processing IHS 206. Those sub-jobs may then be distributed to the node IHS's 206a, 206b, and 206c for processing, followed by the collection of the sub-job results from the node IHS's 206a, 206b, and 206c, and then the combination of the sub-job results into a job result. At block 310, the node IHS's 206a, 206b, and 206c may process the log file data in parallel, and multiple jobs may be processed in parallel as well (e.g., similar to the other jobs discussed herein).

Referring now to FIGS. 3, 4, 5d, 5e, and 5f, the method 300 then proceeds to block 312 where a job result is returned. In an embodiment, upon performing the job in block 310 according to the job request received at block 308, the distributed processing IHS 206 provides the job result over the network to the provider IHS 204. At block 312, the provider IHS 204 may provide a result interface 412 that includes a job result web page 506, illustrated in FIG. 5d. In the illustrated embodiment, the job result web page 506 is provided in response to a job request sent using the run query web page 502, and includes a graphical display 506a of user IHS events over time, along with a event list 506b for each event displayed in the graphical display 506a. In one example, the graphical display 506a includes a plurality of points (e.g., the points 506aa and 506ab) that may be selected in order to display more information on the events that occurred at specific time, and the event list 506b includes a plurality of events (e.g., the events 506ba, 506bb, and 506bc) that include information about events in the log file. One of skill in the art will recognize that, in the illustrated embodiment, a time with more events occurring in the log file may correspond to an error occurring in the user IHS, and thus a user may select the point 506aa (the point corresponding to a time in the log file with a relatively high number of events occurring) to review the events occurring at that time to determine the cause of an error.

In an embodiment, upon performing the job in block 310 according to the job request received at block 308, the distributed processing IHS 206 provides the job result over the network to the provider IHS 204. At block 312, the provider IHS 204 may provide result interface 412 that includes job result web pages 508 and 510, illustrated in FIGS. 5e and 5f. In an embodiment, a controller on one or more user IHS's 202 (e.g., an AIM controller discussed above) manages a plurality of software images, called personas, that may include an OS image, applications installed in the OS, and configuration metadata such as network configuration attributes. In some instances, personas may be simply referred to as operating system images even though they may contain an OS image, applications, configuration metadata, etc. These personas (or operating system images) may be booted on any of the user IHS's 202 in the diagnostic system, and a data store may be provided to store and replicate these personas. In the illustrated embodiment, the job result web pages 508 and 510 are provided in response to a job request sent using the run reports page 504, and include graphical displays 508a and 510a of a persona life cycle. In one example, the graphical display 508a includes a visual timeline having a plurality of events 508aa, 508ab, 508ac, and 508ad that may be selected in order to display more information on those events. As can be seen, the persona in the illustrated embodiment was started at event 508aa, booted at event 508ab, and was runnable at event 508ac, all occurring around approximately the same time. The persona of the illustrated embodiment then booted at event 508ad, shortly after the events 508aa, 508ab, and 508ac. One of skill in the art will recognize that, in the illustrated embodiment, after becoming runnable at event 508ac, the persona should not have booted at event 508ad. The event 508ac may then be selected such that the provider IHS 204 provides the graphical display 510a that includes an information window 510aa that includes information that allows a determination of the cause of the error that resulted in the booting at event 508ad. Thus, if there is an on/off state or startup/shutdown in the system, it may be represented in a timeline.

Thus, a system and method have been described that provide the large log files from one or more user IHS's to a distributed processing IHS over a network, parse those log files to clean and structure the data, and the perform jobs on the parsed log file data to provide job results that may be used as a diagnostic tool for finding the cause of user IHS errors. The use of the distributed processing IHS allows for the entirety of these large log files to be used to generate queries and reports about the health of the user IHS, the life cycle of personas running on the IHS, and/or a variety of other IHS diagnostic results known in the art. The diagnostic systems and methods allow a single user IHS to be diagnosed, or a plurality of user IHS's to be diagnosed. Using the job results of the systems and methods described above, a repository of reoccurring errors may be created, along with any associated solutions. In addition to error diagnosis, the log file data may be used for usage efficiency calculations, tracking, security breaches, statistics such as processing times, and/or a variety of other log file data uses known in the art.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An error determination system, comprising:
a user subsystem that is configured to:
generate a log file that details the operation of the user subsystem, wherein the log file includes a plurality of logs comprising:
 a first portion of the plurality of logs, wherein each log included in the first portion of the plurality of logs includes log data that is related to errors and log data that is unnecessary for error diagnosis; and
 a second portion of the plurality of logs, wherein each log included in the second portion of the plurality of logs is unnecessary for error diagnosis; and
display a graphical user interface that is configured to initiate error diagnosis; and
an error diagnosis subsystem that is coupled to the user subsystem, wherein the error diagnosis subsystem is configured to:
 access the log file in response to an instruction provided via the graphical user interface;
 remove the second portion of the plurality of logs that are unnecessary for error diagnosis;
 remove the log data that is unnecessary for error diagnosis from each log included in the first portion of the plurality of logs to provide filtered log data;
 provide the filtered log data in predefined locations included in a data structure to create structured, filtered log data;

perform error diagnosis on the structured, filtered log data to determine at least one cause of an error in the user subsystem; and communicate the at least one cause of the error in the user subsystem.

2. The system of claim 1, wherein the predefined locations include predefined columns in the data structure.

3. The system of claim 2, wherein the predefined columns include a timestamp column, a component column, and a log message column.

4. The system of claim 1, wherein the second portion of the plurality of logs that are unnecessary for error diagnosis includes logs generated without timestamps, and wherein the log data that is unnecessary for error diagnosis and that is included in each log included in the first portion of the plurality of logs includes tags.

5. The system of claim 1, wherein the error diagnosis subsystem is further configured to:

store the at least one cause of the error in the user subsystem in a reoccurring error repository.

6. The system of claim 1, wherein the error diagnosis subsystem is further configured to:

receive an alert from the user subsystem that is associated with the error in the user subsystem and, in response, perform the error diagnosis.

7. The system of claim 1, wherein the error diagnosis subsystem is further configured to:

provide, for display on a display device, a graphical rendering of at least some of the structured, filtered log data.

8. An information handling system (IHS), comprising:

a processing system; and a memory system that includes instructions that, when executed by the processing system, cause the processing system to:

access a log file that details the operation of a user subsystem, wherein the log file includes a plurality of logs comprising:

a first portion of the plurality of logs, wherein each log included in the first portion of the plurality of logs includes log data that is related to errors and log data that is unnecessary for error diagnosis; and a second portion of the plurality of logs, wherein each log included in the second portion of the plurality of logs is unnecessary for error diagnosis;

remove the second portion of the plurality of logs that are unnecessary for error diagnosis;

remove the log data that is unnecessary for error diagnosis from each log included in the first portion of the plurality of logs to provide filtered log data;

provide the filtered log data in predefined locations included in a data structure to create structured, filtered log data;

perform error diagnosis on the structured, filtered log data to determine at least one cause of an error in the user subsystem; and communicate the at least one cause of the error in the user subsystem.

9. The IHS of claim 8, wherein the predefined locations include predefined columns in the data structure.

10. The IHS of claim 9, wherein the predefined columns include a timestamp column, a component column, and a log message column.

11. The IHS of claim 8, wherein the second portion of the plurality of logs that are unnecessary for error diagnosis includes logs generated without timestamps, and wherein the log data that is unnecessary for error diagnosis and that is included in each log included in the first portion of the plurality of logs includes tags.

12. The IHS of claim 8, wherein the memory system includes instructions that, when executed by the processing system, cause the processing system to:

store the at least one cause of the error in the user subsystem in a reoccurring error repository.

13. The system of claim 1, wherein the memory system includes instructions that, when executed by the processing system, cause the processing system to:

receive an alert from the user subsystem that is associated with the error in the user subsystem and, in response, perform the error diagnosis.

14. The system of claim 1, wherein the memory system includes instructions that, when executed by the processing system, cause the processing system to:

provide, for display on a display device, a graphical rendering of at least some of the structured, filtered log data.

15. A method for determining errors, comprising:

accessing, by an error diagnosis subsystem in response to an instruction provided on a graphical user interface on a user subsystem, a log file that details the operation of the user subsystem, wherein the log file includes a plurality of logs comprising:

a first portion of the plurality of logs, wherein each log included in the first portion of the plurality of logs includes log data that is related to errors and log data that is unnecessary for error diagnosis; and a second portion of the plurality of logs, wherein each log included in the second portion of the plurality of logs is unnecessary for error diagnosis;

removing, by the error diagnosis subsystem, the second portion of the plurality of logs that are unnecessary for error diagnosis;

removing, by the error diagnosis subsystem, the log data that is unnecessary for error diagnosis from each log file included in the first portion of the plurality of logs to provide filtered log data;

providing, by the error diagnosis subsystem, the filtered log data in predefined locations included in a data structure to create structured, filtered log data;

performing, by the error diagnosis subsystem, error diagnosis on the structured, filtered log data to determine at least one cause of an error in the user subsystem; and communicating, by the error diagnosis subsystem, the at least one cause of the error in the user subsystem.

16. The method of claim 15, wherein the predefined locations include predefined columns in the data structure that include at least one of a timestamp column, a component column, and a log message column.

17. The method of claim 15, wherein the second portion of the plurality of logs that are unnecessary for error diagnosis includes logs generated without timestamps, and wherein the log data that is unnecessary for error diagnosis and that is included in each log included in the first portion of the plurality of logs includes tags.

18. The method of claim 15, further comprising:

storing, by the error diagnosis subsystem, the at least one cause of the error in the user subsystem in a reoccurring error repository.

19. The method of claim 15, further comprising:
receiving, by the error diagnosis subsystem, an alert from the user subsystem that is associated with the error in the user subsystem and, in response, perform the error diagnosis.

20. The method of claim 15, further comprising:
provide, by the error diagnosis subsystem for display on a display device, a graphical rendering of at least some of the structured, filtered log data.

* * * * *